United States Patent [19]

Zallie et al.

[11] Patent Number: 4,937,091

[45] Date of Patent: Jun. 26, 1990

[54] IMITATION CHEESES CONTAINING ENZYMATICALLY DEBRANCHED STARCHES IN LIEU OF CASEINATES

[75] Inventors: James P. Zallie, Bound Brook; Chung-Wai Chiu, Westfield, both of N.J.

[73] Assignee: National Starch and Chemical Investment Holding Corporation, Wilmington, Del.

[21] Appl. No.: 258,237

[22] Filed: Oct. 14, 1988

[51] Int. Cl.$^5$ ............................................. A23C 20/00
[52] U.S. Cl. ...................................... 426/582; 426/20; 426/661
[58] Field of Search ...................... 426/582, 661, 20

[56] References Cited

U.S. PATENT DOCUMENTS

| | | | |
|---|---|---|---|
| 3,397,994 | 8/1968 | Elenbogen et al. | 99/116 |
| 3,502,481 | 3/1970 | Schaap et al. | 99/116 |
| 3,565,765 | 2/1971 | Heady et al. | 426/661 |
| 3,806,606 | 4/1974 | Seiden | 426/188 |
| 3,922,374 | 11/1975 | Bell | 426/582 |
| 4,001,435 | 1/1977 | Hirao et al. | 426/3 |
| 4,075,360 | 2/1978 | Rule | 426/582 |
| 4,104,413 | 8/1978 | Wynn et al. | 426/582 |
| 4,110,484 | 8/1978 | Rule | 426/582 |
| 4,166,142 | 8/1979 | Chang | 426/582 |
| 4,197,322 | 4/1980 | Middleton | 426/36 |
| 4,232,050 | 11/1980 | Rule | 426/582 |
| 4,499,116 | 2/1985 | Zwiercan | 426/582 |
| 4,560,651 | 12/1985 | Nielsen et al. | 435/95 |
| 4,608,265 | 8/1986 | Zwiercan et al. | 426/582 |
| 4,695,475 | 9/1987 | Zwiercan et al. | 426/582 |
| 4,726,957 | 2/1988 | Lacourse et al. | 426/578 |

OTHER PUBLICATIONS

Anon., Bulletin-Leatherhead Food R.A., vol. 22, No. 6, Jun., 1988.
Rutenberg, M. W., "Starch and Its Modifications", pp. 22-36 in Handbook of Water-Soluble Gums and Resins, Davidson (Editor), McGraw Hill Book Co., N.Y., N.Y., (1980).

*Primary Examiner*—Donald E. Czaja
*Assistant Examiner*—Helen Pratt
*Attorney, Agent, or Firm*—Mary E. Porter; Edwin M. Szala

[57] ABSTRACT

The caseinates which provide imitation cheeses with desirable texture, melt and oil emulsification characteristics are replaced in whole, or in part, by pregelatinized debranched starches which have been enzymatically prepared by hydrolyzing all, or part, of the alpha-1,6-D-glycosidic bonds of branched starch molecules (amylpectin). The debranched starches may be derivatized, converted or crosslinked, or blended with other selected starches in imitation cheeses.

20 Claims, No Drawings

IMITATION CHEESES CONTAINING ENZYMATICALLY DEBRANCHED STARCHES IN LIEU OF CASEINATES

BACKGROUND OF THE INVENTION

This invention relates to imitation cheeses, such as cheddar, processed American, cream and mozzarella cheeses, wherein the caseinates are partially or totally replaced by pregelatinized starches which have been partially debranched by treatment with a starch debranching enzyme to yield a mixture of partially debranched amylopectin and short chain amylose, in addition to any amylopectin and long chain amylose which may be present in the untreated starch.

Amylose is a linear polymer of glucopyranosyl units, bonded by alpha-1,4-D-glucosidic linkages, which comprises one of the two types of polymers present in starch. Native starches also contain amylopectin, a branched polymer of short, linear alpha-1,4-D-glucosidic chains linked by alpha-6-D-glucosidic bonds at the branch points.

This invention also relates to imitation cheeses wherein the caseinates are replaced by starch which has been fully debranched by treatment with a starch debranching enzyme to yield short chain amylose, together with any long chain amylose which may be present in the untreated starch.

Early attempts to reduce cheese costs led to the development of cheese analogs in which vegetable fat replaced the more costly milk fat. Such analogs were usually manufactured by traditional methods from skim milk containing dispersed vegetable fats and were generally referred to as "filled" cheeses.

Later economic incentives and technical advances led to the development of fabricated cheese analogs manufactured from casein (milk protein) or its derivatives, vegetable fats or oils, salts, acids, and flavorings. Since casein derivatives are legally defined as non-dairy ingredients, the fabricated analogs were referred to as "imitation" cheeses.

Imitation cheeses include high-moisture content cheeses such as cream cheese, blue cheese and mozzarella, the latter accounting for a major portion of the casein-based imitation cheese market; medium-moisture cheeses, such as cheddar and provolone; low moisture cheeses, such as romano and parmesan; and pasteurized processed cheeses such as American cheese, cheese spreads and cheese products. These imitation cheeses provide the flavor and functionality of natural cheese at a reduced cost and, in addition, are lower in cholesterol since the animal fat has been replaced by vegetable fat.

Rennet casein, sodium, potassium, and calcium caseinates, and salts generated in situ by treating acid casein with the appropriate alkali, are used in the preparation of the imitation cheeses. All forms of casein useful herein are referred to as "caseinates". Besides providing a major protein source, the caseinates possess desirable setting, textural and emulsification properties, and their moderately low viscosity permits their use at high solids.

The high cost and uncertain availability of caseinates have been a major concern to food processors. For these reasons, the processors have been trying to find a readily available caseinate substitute, preferably a low cost substitute, to partially or totally replace the caseinates in imitation cheeses.

Substitutes for caseinates have included soy protein isolates, alfalfa protein, wheat gluten, starches, flours, corn syrup and mixtures thereof. The history of the use of such caseinate substitutes and methods for preparation of imitation cheeses are set forth in U.S. Pat. No. 4,499,116 issued Feb. 12, 1985 to Zwiercan et al. ("Zwiercan ,116") and in U.S. Pat. No. 4,695,475 issued Sept. 22, 1987 to Zwiercan et al. ("Zwiercan ,475") which are hereby incorporated by reference.

Certain starches have been successfully employed as caseinate replacers in imitation cheeses. The starches useful as caseinate replacers differ from starches and flours which have been used in various cheese products as thickeners, binders, and the like. Unlike the thickeners and binders, the caseinate replacement starches provide the texture, thermoreversibility (melt) and emulsification characteristics of caseinates in imitation cheeses. A starch characterized by thermoreversibility forms a gel when a cooked aqueous starch dispersion is cooled, which gel melts upon reheating and sets again upon cooling.

Zwiercan '116 discloses an imitation cheese wherein up to 80% of the caseinate is replaced by starches including pregelatinized converted starches (5-90 WF) (Water Fluidity) having an amylose content of at least 15% and no more than 40% and selected derivatives and crosslinked products thereof.

U.S. Pat. No. 4,608,265 issued Aug. 26, 1986 to Zwiercan et al. ("Zwiercan '265") discloses an imitation cheese, wherein 25 to 50% of the caseinate is replaced by pregelatinized modified high amylose starches, preferably converted and derivatized. The starch has an amylose content of at least 40% ("high amylose starch") and is preferably selected from the group consisting of derivatized starch, converted starch, converted and derivatized starch and crosslinked starch. The high amylose starch may be mixed with up to 80% by weight of a low amylose starch (less than 40% amylose). Zwiercan '475 discloses an imitation cheese wherein up to 100% of the caseinate is replaced by a pregelatinized, converted and derivatized high amylose starch.

High amylose starches are obtained from special hybrids of corn, barley and pea which contain as much as 70% amylose, and are more expensive and more difficult to isolate than the starches from more readily available sources such as corn, potato, wheat, rice, tapioca and the like. Most of the readily available starches contain less than 30% amylose.

In this invention, a starch containing a high percentage of short chain amylose is produced from any of the more readily available amylopectin-containing starches by treating the starch with an enzyme capable of cleaving the alpha-1,6-D-glucosidic linkages of the amylopectin. This enzymatic treatment cleaves the branch points on the amylopectin molecule, yielding a mixture of short chain amylose and partially debranched amylopectin, together with any remaining amylopectin or any long chain amylose present in the untreated starch.

In addition to providing functional properties similar to a high amylose starch (e.g., gel strength), this debranched starch mixture also improves the quality of the gel and melt properties of imitation cheeses. As a further advantage, for imitation cheeses wherein a label declaration for a modified starch (e.g., an ester derivative) is not desirable, but the functionality of the modified starch (e.g., thermoreversibility) is desirable, the debranched starches provide a "natural" alternative.

Thus, it is an object of this invention to provide functionally equivalent imitation cheeses wherein the caseinates are replaced by enzymatically debranched starches.

SUMMARY OF THE INVENTION

This invention provides a functionally equivalent imitation cheese wherein up to 100% of the caseinate is replaced with a pregelatinized waxy maize, potato or tapioca starch which has been partially enzymatically debranched by treatment with an endo-alpha-1,6-D-glucanohydrolase to yield a mixture of partially debranched amylopectin and short chain amylose, in addition to any remaining amylopectin or any long chain amylose present in the untreated starch, which mixture provides the texture, thermoreversibility and emulsification characteristics of caseinates in imitation cheese. This invention also provides an imitation cheese wherein up to 80% of the caseinate is replaced with a partially debranched starch from any source, including corn. In addition, this invention provides an imitation cheese wherein up to one-third of the caseinate is replaced with a fully debranched starch.

For the purposes of this invention, partially debranched starch comprises up to 80%, by weight, short chain amylose and at least 20%, by weight, partially debranched amylopectin. In fully debranched starch substantially all amylopectin has been debranched and further enzyme activity produces no measurable change in the percentage of short chain amylose.

A partially debranched waxy maize, potato or tapioca starch may be employed at a 100% caseinate replacement level. The starch may be crosslinked by treatment with phosphorus oxychloride or other crosslinking agents. Alternatively, it may be treated with 0.5 to 3% octenyl succinic acid anhydride to form the ester derivatives (OSA starch). Additionally, the partially debranched waxy maize, potato or tapioca starch may be blended with a partially debranched OSA corn starch and the blend may be used to replace 100% of the caseinates in imitation cheese.

Any partially debranched starch may be employed at an 80% caseinate replacement level. The debranched starch may be selected from the group consisting of starch, converted starch, starch derivatives, starch which is converted and derivatized, and crosslinked starch. The debranched starch comprises up to 80% short chain amylose, with the balance comprising partially debranched amylopectin, together with any remaining amylopectin and any native long chain amylose.

When the starch is fully debranched by enzymatic treatment it may be used to replace up to one-third of the caseinate in imitation cheese. The fully debranched starch may be selected from the group consisting of starch, starch derivatives and crosslinked starch.

Either partially or fully debranched starch may be blended with from 20 to 80% of one or more starches, selected from the group consisting of waxy maize starch or root or tuber-like starches, which are unmodified, or debranched, or derivatized, or precooked and spray-dried, or acid-converted, or crosslinked, or any combination thereof.

As used herein, the term "imitation cheese" refers to any cheese analog, capable of melting at the temperatures at which natural and imitation cheese melt, which is typically prepared from water, vegetable fat(s) or vegetable oil(s), the starch(es) described herein, typical cheese additives such as natural and artificial flavorings, salts (sodium chloride and other salts), acids, colors, emulsifiers, stabilizers and preservatives, and, optionally, the edible caseinates typically present in the cheeses.

DESCRIPTION OF THE PREFERRED EMBODIMENTS

Starches suitable herein include any amylopectin-containing starch that is susceptible to attack by a debranching enzyme, such as pullulanase, with the resultant hydrolysis of the alpha-1,6-D-glucosidic bond. Suitable starches include corn, potato, sweet potato, wheat, rice, sago, tapioca, sorghum, waxy maize, smooth pea, Canadian pea, and the like.

The debranched starch is pregelatinized to form a cheese having desirable textural properties. It may be used in a dried form or as an aqueous dispersion following gelatinization. Numerous methods of pregelatinizing starch, such as jet cooking, drum drying and steam injection atomization processes, are well known in the art. Any method may be used herein. In a preferred embodiment, the starch is slurried in water and jet cooked at approximately 300° F. (149° C.) to instantaneously gelatinize the starch and dried.

Converted debranched starches may be used herein. Conversion degrades the starch and reduces the viscosity of the cooked starch dispersions. Converted debranched starches improve the melt of the final cheese product. Suitable conversion of the starches to thin-boiling or fluidity starches useful herein may be achieved by standard oxidative, heat, acid or alpha-amylase enzyme conversion techniques which are well known in the art. A method for starch conversion employing alpha-amylase enzyme is disclosed in U.S. Pat. No. 4,726,957 to Lacourse, et al., and is well known in the art.

It will be appreciated by the practitioner that, while acid-and enzyme-conversions may be carried out on either a derivatized starch or an underivatized starch, it is common practice to use the underivatized starch for the acid-conversion.

Derivatized starches and starches that have been converted and derivatized are suitable for debranching and for use in imitation cheese. Suitable derivatives include esters such as the acetate and half-esters such as the succinate and octenylsuccinate prepared by reaction with acetic anhydride, succinic anhydride and octenyl-succinic anhydride, respectively; the phosphate derivative prepared by reaction with sodium or potassium orthophosphate or tripolyphosphate; ethers such as hydroxypropyl ether prepared by reaction with propylene oxide; and any other edible starch derivatives approved for use in food products.

Each modified starch should have a suitable degree of substitution (D.S.) and/or conversion to provide a balance between gel strength and melting characteristics as desired by the practitioner. The amounts of derivatizing reagent used will depend upon the type of reagent, the amylose content of the starch or starch mixtures, and the amount of conversion and debranching. Converted starches, highly debranched starches or starches having a higher amylose content (e.g., 70% vs. 50%) form stronger gels. Typically, as the conversion or debranching is increased, the derivatization should be controlled to provide a proper balance of properties. The practitioner will also recognize that the gel strength required will vary with the cheese type and its moisture content.

The OSA starch derivatives are preferred when better emulsifying properties are required. The practitioner will recognize that the emulsifying properties required will depend not only on the oil or fat content of the cheese product but also on the amount of caseinate being replaced. The preferred starch derivatives for use in imitation mozzarella cheese formulations are jet-cooked, debranched starch derivatives which have been prepared by treatment with about 0.5 to 3% octenylsuccinic anhydride, or jet-cooked, acid-converted debranched OSA starch derivatives having a water fluidity of 50 or less.

The starches may be crosslinked before debranching to provide heat and shear tolerance in the imitation cheeses.

Crosslinked starches useful herein may be prepared according to procedures described in the prior art. The reaction conditions employed will vary with the type of crosslinking agent used, as well as the type of starch base, the batch size, and the like.

Crosslinking agents suitable for food starches include epichlorohydrin, phosphorous oxychloride, sodium trimetaphosphate, and adipic-acetic anhydride. Treatments with sodium trimetaphosphate providing up to 0.04% bound (residual) phosphate, calculated as phosphorus are permitted. Treatments with adipic-acetic anhydride may include up to 0.12% adipic anhydride and up to 2.5% bound acetyl. Phosphorus oxychloride is preferred in an amount of about 0.05%, by weight of starch.

The above starch modification procedures, i.e. pregelatinization, conversion, dextrinization, derivatization, and crosslinking are conventional, well-known to those skilled in the art, and described in such publications as "Starch and Its Modifications" by M. W. Rutenberg, pp. 22-36, in *Handbook of Water-soluble Gums and Resins*, Robert L. Davidson (Editor), McGraw Hill Book Co., New York, New York, 1980.

In the preparation of the modified starches, the conversion or dextrinization, is typically carried out prior to the pregelatinization step. It is possible, however, to pregelatinize the starch prior to these treatments. Likewise, the derivatization or crosslinking is typically carried out prior to pregelatinization; however, this sequence can also be reversed.

In a preferred embodiment, the next step after preparing the modified starch is to gelatinize the starch, thereby disrupting, in whole or in part, the associative bonding of the starch molecules in the granular structure, making the molecule more accessible to the enzyme, and permitting the enzyme to more easily and uniformly debranch the starch molecules. After the starch has been gelatinized, the solids, temperature and pH of the aqueous starch dispersion are adjusted to provide maximum enzyme activity.

Optimum parameters for enzyme activity will vary depending upon the enzyme used. Thus, the rate of enzyme degradation depends on factors including enzyme concentration, substrate concentration, pH, temperature, the presence or absence of inhibitors and other factors. Depending on the type of enzyme, or its source, various parameters may require adjustment to achieve optimum digestion rate. In general, the preferred enzyme digestion reaction is carried out at the highest feasible solids content to facilitate subsequent drying of the starch composition while maintaining optimum reaction rates. For example, for the pullulanase used herein to produce a starch suitable for use as a caseinate replacer, a precooked starch dispersion ranging up to 28% solids is preferred.

The practitioner will recognize that a higher solids starch system (e.g., above 50% solids) may be employed if the starch is gelatinized in a process which produces adequate mixing to uniformly blend the enzyme with the starch at higher solids. The practitioner will also recognize that the temperature, treatment time and other parameters of the enzymatic debranching process must be adjusted to the higher solids content. Processes which employ higher solids dispersions are intended to fall within the scope of this invention and may be used to prepare the debranched starch herein.

Although the process of this invention is illustrated employing pullulanase (E.C. 3.2. 1.41, pullulan 6-glucanohydrolase) as the enzyme component, other endo-alpha-1,6-D-glucanohydrolases such as isoamylase (E.C. 3.2. 1.68), or any other endo-enzyme which exhibits selectivity in cleaving the 1,6-linkages of the starch molecules, leaving the 1,4- linkages substantially intact, and yielding short chain amylose, may be used to prepare the debranched starch herein.

In a preferred embodiment, the enzyme used is a heat stable debranching enzyme obtained from a novel species of Bacillus. It belongs to the group of debranching enzymes known as pullulanases. It catalyzes the hydrolysis of the alpha-1,6 linkages in pullulan and amylopectin, provided that there are at least two glucose units in the side chain. Pullulan is a linear polymer consisting essentially of D-glucopyranosyl triose units joined by alpha-1,6 linkages.

Optimum concentrations of enzyme and substrate are governed by the level of enzyme activity and the enzyme source.

Although the process of this invention makes use of an enzyme in solution, processes utilizing an enzyme immobilized on a solid support are intended to fall within the scope of this invention.

The debranching may proceed in the presence of buffers to ensure that the pH will be at the optimum level throughout the degradation. Buffers such as acetates, citrates, or the salts of other weak acids are acceptable. Other agents may be used to optimize enzyme activity. The reaction may be carried out in a pH range from about 3 to 7.5, with the preferred range being between 4.5 and 5.5 and the optimum being 5.0 at 60° C. for the *Bacillus pullulanase*.

The aqueous starch dispersion should be held during the enzymatic debranching at a temperature of about 25°-100° C., the preferred range being 55°-65° C. and the optimum being 60° C. at pH 5.0 for the *Bacillus pullulanase*. However, if shorter treatment times are desired, a temperature range from 60°-65° C. or a higher enzyme concentration may be used. Alternatively, higher temperatures may be employed if a thermally stable debranching enzyme which yields short chain amylose from starch is selected for use herein. As with other parameters which define enzymatic activity, the preferred and optimum temperature ranges will vary with changes in other parameters such as substrate concentration, pH and other factors, and can be determined by the practitioner.

The enzyme reaction is permitted to continue until the desired level of debranching is reached. The progress of enzyme reaction may be measured by various methods. If all critical parameters have been established for achieving a particular starch composition, then the reaction may be allowed to proceed to a predetermined relative end point in time. The end point also may be monitored and defined by measuring the concentration of reducing groups which are freed by alpha-1,6-D-glucanohydrolase activity by methods well known in the art. Other techniques such as monitoring the change in viscosity, iodine reaction, or the change in molecular weight may be used to define the reaction end point.

In a preferred embodiment, the debranching end point is measured by determining the funnel viscosity for starches containing less than 25% amylose and the caustic funnel viscosity or Water Fluidity for corn starches and other long chain amylose-containing starches.

The short chain amylose content is preferably measured by gel permeation chromatography. After separating the starch into its different molecular weight fractions by gel permeation chromatography, the percentage of short chain amylose is determined by calculating the percentage, by weight, of the partially debranched starch which is eluted in the low molecular weight fraction. It will be understood by the practition that these percentages are approximately equal to the amount of short chain amylose which has been liberated from the amylopectin by the debranching enzyme. Experimental error in gel permeation chromatograph (e.g., due to contamination by the enzyme, or by sugars or dextrins introduced with the starch, the enzyme solution, the buffer or other process components) may result in a percent low molecular weight fraction which may range up to about 5% more than the percent short chain amylose in the starch sample.

The degree of starch debranching needed for imitation cheese formulations depends on the type of starch utilized, the presence and nature of any substituent groups, the degree, if any, of conversion and the type of cheese formulation.

In a preferred embodiment, the starch is debranched to yield a mixture comprising up to 80%, by weight, short chain amylose, and at least 20%, by weight, partially debranched amylopectin. This starch may be employed to replace up to 80% of the caseinate in imitation cheese. Up to 100% of the caseinates may be replaced by debranched waxy maize, potato or tapioca starch, preferably comprising from 40-60%, by weight, short chain amylose.

After the desired degree of starch debranching has been reached, the enzyme may be deactivated. Pullulanase is rapidly deactivated at temperatures above about 70° C., therefore, the reaction may be conveniently terminated by increasing the temperature of the starch dispersion to at least 75° C. for about 15 minutes.

If purification of the debranched starch composition is required, reaction impurities and by-products may be removed by dialysis, filtration, centrifugation or any other method known in the art for isolating and concentrating starch compositions.

If a dried starch composition is desired, the starch may be dried by any of the methods known in the art.

STARCH BLENDS

Blends of starches which contain at least 20% of the enzymatically debranched starch may be prepared for use in the cheeses. The blends preferably contain no more than 80%, and most preferably 40-60%, of a starch selected from the group consisting of a waxy maize, or root or tuber-like starch which is unmodified, or debranched, or derivatized, or pregelatinized and spray-dried or acid-converted, or crosslinked, or any combination thereof. The blend employed is not critical provided that it yields the desirable melt, oil emulsification, string, shred and gel character of caseinate-based imitation cheese. The practitioner may select the blends suggested herein or any suitable alternatives.

The starches which are blended with debranched starches may or may not be pregelatinized. They may be converted to thin-boiling or fluidity starches by standard oxidative, heat, acid or alpha-amylase enzyme conversion techniques. For starches which are blended with the debranched starch, oxidative, heat or acid conversion is preferred due to the ease in handling and recovery afforded by granular starch, as opposed to the dispersed form of starch used in alpha-amylase conversion.

Derivatized starches and starches that have been converted and derivatized are suitable for blending with the debranched starches. Suitable derivatives include esters such as the acetate and half-esters such as the succinate and octenylsuccinate prepared by reaction with acetic anhydride, succinic anhydride and octenylsuccinic anhydride, respectively; the phosphate derivative prepared by reaction with sodium or potassium orthophosphate or tripolyphosphate; ethers such as hydroxypropyl ether prepared by reaction with propylene oxide; and any other edible starch derivatives approved for use in food products.

Each modified starch should have a suitable degree of substitution and conversion to provide a balance between gel strength and melting characteristics as desired by the practitioner.

In a preferred embodiment, a 40/60 blend of partially debranched waxy maize starch (10 second funnel viscosity at solids) and a cold-water-swelling, acid-converted (43 WF) tapioca starch is employed to replace 33% of the caseinates in imitation cheese.

Blends of debranched OSA starch derivatives are employed in other preferred embodiments of this invention, particularly blends of OSA waxy maize starch derivatives and OSA corn starch derivatives. In a preferred embodiment, a blend of 45% of an unmodified waxy maize starch, which was enzymatically debranched to a funnel viscosity of 47 seconds at 10% solids, and 55% of a 0.75% OSA corn starch derivative, which was debranched to a funnel viscosity of 36 seconds at 10% solids, replaces 100% of the caseinate in an imitation cheese. In a second preferred embodiment, a starch blend of 40% of a 1% OSA waxy maize starch derivative, which was enzymatically debranched to a funnel viscosity of 12 seconds at 19% solids, and 60% of a 0.5% OSA waxy maize starch derivative, which was enzymatically debranched to a funnel viscosity of 50 seconds at 10% solids, replaces 50% of the caseinate in an imitation cheese formula. The blend of debranched starches employed is not critical provided that it yields the desirable melt, oil emulsification, string, shred and gel character of caseinate-based imitation cheese.

IMITATION CHEESES

The preparation of the imitation cheeses is well-known to those skilled in the art. Methods for the preparation of typical cheese products are described in the following patents, whose disclosures are incorporated herein by reference:

U.S. Pat. Nos. 4,232,050 and 4,075,360 (issued Nov. 4, 1980 and Feb. 21, 1978 to Rule) which disclose methods for the preparation of imitation mozzarella cheeses;

U.S. Pat. No. 4,197,322 (issued Apr. 8, 1980 to Middleton) which describes the preparation of imitation cheeses such as mozzarella and processed American Cheeses;

U.S. Pat. No. 4,104,413 (issued Aug. 1, 1978 to Wynn et al.) which describes the preparation of imitation cheeses, such as mozzarella and cheddar cheeses;

U.S. Pat. No. 3,922,374 (issued Nov. 25, 1975 to Bell) which describes a process for the preparation of imitation cheeses such as pasta filata (mozzarella), cheddar, and pasteurized processed American cheeses;

U.S. Pat. Nos. 3,397,994 and 4,166,142 (issued Aug. 20, 1968 and Aug. 28, 1979 to Elenbogen et al. and Elenbogen) which describe methods for the preparation of imitation cream cheese spread and imitation cheese spreads;

U.S. Pat. No. 3,502,481 (issued Mar. 24, 1970 to Schaap et al.) which describes the preparation of cheese-like spreads;

U.S. Pat. No. 3,806,606 (issued Apr. 23, 1974 to Seiden) which describes the preparation of synthetic cheese having the texture and eating quality of natural dairy cheese; and U.S. Pat. No. 4,110,484 (issued Aug. 29, 1978 to Rule) which describes a process for the manufacture of acid-set imitation and filled cheese products.

The preferred imitation mozzarella cheeses herein are typically prepared from 20 to 24% of a vegetable fat such as shortenings like Kaomel® or vegetable oils such as corn, sesame, cottonseed, safflower, groundnut, coconut, soybean, olive, palm kernel, and/or wheatgerm oil; from 20 to 30% of a mixture of 20-80% sodium and/or calcium caseinates or casein, or blends thereof, and about 20-80% of th pregelatinized converted and/or derivatized debranched starch or its mixtures with other starches; about 40 to 55% water; about 0.5 to 3.0% sodium chloride; about 2 to 6% sodium citrate; about 0.8 to 2.5% trisodium phosphate, sodium aluminum phosphate, and/or calcium phosphate; 0.5 to 2.0% adipic, lactic, and/or sorbic acid; and 0.0001 to 1% cheese additives such as butter flavoring.

In imitation mozzarella cheese, a mixture of sodium and calcium caseinate or casein may be used to provide the final stretch, emulsifying, gel and melt properties. For the replacement cheeses both sodium and calcium caseinate systems are useful with the starches herein. The solubilized caseinates may be formed in situ by adding an alkali such as sodium, potassium or calcium hydroxide to dispersions of acid casein. In a preferred embodiment, an agglomerated sodium caseinate is employed.

Typically, the above cheeses are prepared by forming an emulsion of the caseinate, starch, and water with the melted fat or oil and adding the salts and acids at the appropriate times. The mixture is heated during the emulsification and the final plastic mass is compressed and refrigerated for several days.

The emulsion may be formed in several ways, such as the following:

(1) mixing the water and casein, allowing the casein to partially hydrate, and then adding the oil, starch, acids, salts, flavor and color;

(2) blending the casein and starch with the oil and then adding the water, salt, and acid;

(3) adding all the ingredients (both wet and dry) and mixing them in a cooker, typically with a double screw mixing system;

(4) mixing the water (hot) and salt, adding a blend of casein and starch, and then adding the oil and acid;

(5) mixing the oil and water, adding the blended casein and starch, and then adding salt and acid;

(6) mixing all the dry ingredients except the acid, adding about 75% of the water (hot), adding most of the oil (about 70%), and then adding the remaining water, acid, and remaining oil; or (7) mixing the casein, salt, and water, adding a mixture of the oil and starch, and adding the acid after cooking.

The above procedures may also be used when no casein is present and when melted fat or shortening is used in place of oil. Typically the cooking is carried out by heating the mixture to an internal temperature of about 160°-185° F. The cooking time will vary depending upon the type of casein or caseinate utilized and upon the type of cooker selected, many of which use steam injection.

Imitation processed American and Cheddar cheeses and cream cheese have a similar composition except that fat and water content varies and different salt(s) and/or acid(s) are used in their preparation.

In the examples which follow, all parts and percentages are given by weight and all temperatures are in degrees Celsius unless otherwise noted. The following testing procedures are used in the examples to characterize the starch products herein.

WATER FLUIDITY MEASUREMENT

The water fluidity of the starches is measured using a Thomas Rotational Shear-Type Viscometer (manufactured by Arthur H. Thomas Co., Philadelphia, Pa. 19106), standardized at 30° C. with a standard oil having a viscosity of 24.73 cps., which oil requires 23.12±0.05 sec. for 100 revolutions. Accurate and reproducible measurements of the water fluidity are obtained by determining the time which elapses for 100 revolutions at different solids levels depending on the starch's degree of conversion (as conversion increases, the viscosity decreases). The procedure used involves slurrying the required amount of starch (e.g., 6.16 g, dry basis) in 100 ml of distilled water in a covered copper cup and heating the slurry in a boiling water bath for 30 minutes with occasional stirring. The starch dispersion is then brought to the final weight (e.g., 107 g) with distilled water. The time required for 100 revolutions of the resultant dispersion at 81°-83° C. is recorded and converted to a water fluidity number using a conversion table.

| Time Required for 100 Revolutions (seconds) Amount of Starch Used (anhydrous, g): | | | | |
|---|---|---|---|---|
| 6.16[a] | 8.80[b] | 11.44[c] | 13.20[d] | Water Fluidity |
| 60.0 | | | | 5 |
| 39.6 | | | | 10 |
| 29.3 | | | | 15 |
| 22.6 | | | | 20 |
| 20.2 | | | | 25 |
| | 33.4 | | | 30 |
| | 27.4 | | | 35 |
| | 22.5 | | | 40 |
| | | 32.5 | | 45 |
| | | 26.8 | | 50 |
| | | 22.0 | | 55 |
| | | | 24.2 | 60 |
| | | | 19.2 | 65 |
| | | | 15.9 | 70 |
| | | | 13.5 | 75 |

-continued

| Time Required for 100 Revolutions (seconds) Amount of Starch Used (anhydrous, g): | | | | |
|---|---|---|---|---|
| 6.16[a] | 8.80[b] | 11.44[c] | 13.20[d] | Water Fluidity |
| | | 11.5 | | 80 |
| | | 10.0 | | 85 |
| | | 9.0 | | 90 |

For a, b, c, and d, final weights of starch solutions are 107, 110, 113, and 115 g, respectively.

FUNNEL VISCOSITY MEASUREMENT

To measure funnel viscosity at 19% solids, 38 g of the starch (anhydrous basis) was weighed into a tared 250 ml beaker (stainless steel) containing a thermometer and brought to 200 g total weight with distilled water. The sample was mixed to dissolve any lumps and heated or cooled to 72° F. (22° C.). A total of 100 ml of the cooked starch dispersion was measured into a graduated cylinder. It was then poured into a calibrated funnel while using a finger to close the orifice. A small amount was allowed to flow into the graduate to remove any trapped air, and the complete balance remaining in the graduate was poured back into the funnel. Using a timer, the time required for the 100 ml sample to flow through the apex of the funnel was recorded.

The funnel was a standard 58°, thick-wall, resistance glass funnel whose top diameter was about 9–10 cm with the inside diameter of the stem being about 0.381 cm. The funnel was calibrated so as to allow 100 ml of water to go through in 6 seconds using the above procedure.

CORN STARCH (CAUSTIC) FUNNEL VISCOSITY

Due to retrogration of the starch which occurs when using corn starch, the funnel viscosity measurement was modified as follows for debranched corn starch:

1. the starch sample weight was reduced to 15 g (anhydrous basis);
2. sufficient hot (at least 90° C.) water was added to the starch to bring it to 150 g total weight;
3. 15 g of 25% w/v sodium hydroxide solution was added to the hot starch slurry; and
4. with stirring, the slurry was cooled to 72° F. and the measurement carried out as set forth above.

GEL PERMEATION CHROMATOGRAPHY

Starches were prepared for analysis by slurrying 5 mg of starch in 4 ml of dimethylsulfoxide ("DMSO") containing 0.3M sodium nitrate and heating the slurry to 80° C. for at least 30 minutes. Samples (200 ul) were injected into an ALC/GPC-150C Chromatograph (Waters Associates, Milford, Mass.) (equipped with a Nelson 3000 Series Chromatography Data System and two PL gel mixed 10 um columns (Polymer Laboratory, Amherst, Mass.), employing DMSO containing 0.03M sodium nitrate as the mobile phase), and eluted at a rate of 1 ml/min. The columns were calibrated using dextran standards (with molecular weights of 2,000; 20,000; 80,000; 500,000; and 2,000,000, obtained from Pharmacia Fine Chemicals, Piscataway, N.J.). The percentage short chain amylose was calculated from the relative area of the peak obtained within the molecular weight range from about 500 to 20,000.

CHEESE EVALUATION

The cheeses were evaluated for gel strength, emulsion stability during preparation (oil retention or oil loss) and after preparation (oil retention or oiling-off on the cheese surface), and for resiliency and springiness by touching and pulling the cheese; for shred by grating the cheese; for melt by heating the grated cheese on a pizza and observing the melt characteristics, i.e. fusion, lack of fusion, or excessive fusion (too much melting resulting in a translucent layer), as well as excessive oil in the melt; and for string by pulling the melted cheese apart. The cheeses were given an overall rating based on the above properties, with cheeses which lost oil during their preparation being given a rating of zero. Rating characteristics are set forth in Table 1. Gel strength and shred were considered the next most important properties. An overall rating below 5 on a scale of 1 to 10 was considered unsatisfactory. The control cheeses were given an automatic rating of 10. This maximum rating was derived by adding individual best scores for:

gel: 5
shred: 5
string: 4
melt: 3
oil release: 3 to give a maximum sum of scores equal to 20. This sum was divided by 2 to give 10 which is the highest overall rating for the cheeses. Acceptable cheeses (i.e. functionally equivalent) had a rating of at least 5, with the substantially equivalent and equivalent cheeses having ratings of 7 to 9.5.

TABLE 1

| Rating Scale for Cheese Evaluation | | | | | |
|---|---|---|---|---|---|
| Characteristic Score | Gel | Shred | String | Melt | Oil Release |
| 5 | Very Firm & Resilient | Excellent | — | — | — |
| 4 | Firm | Very Good | Excellent | — | — |
| 3 | Very Slightly Soft | Good | Good | Excellent | Excellent |
| 2 | Slightly Soft | Fair | Fair | Good (2.0) | Good (2.0) |
| 1 | Soft | Poor | Poor | Fair (1.5) | Fair (1.5) |
| 0 | Too Soft; or Too Firm & not Resilient | — | — (1.0) | Poor (1.0) | Poor |

EXAMPLE 1

This example describes the preparation of imitation mozzarella cheeses based on sodium caseinate formulations containing starch which has been partially debranched by treatment with pullulnase.

PREPARATION OF THE DEBRANCHED STARCH

The starches were converted, derivatized or crosslinked, where applicable, prior to gelatinization and treatment with pullulanase. To convert the starch, a slurry of 100 parts in 150 parts of water was heated to 52° C., the indicated amount of hydrochloric acid (1.75%) was added, and the mixture was stirred for 16 hours at 52° C. The hydrolysis was stopped by neutralizing the mixture with alkali (a solution of 3% sodium hydroxide) to a pH of 5.5. The converted starch was recovered by filtration, washed and dried.

To prepare the octenylsuccinate derivative, 100 parts of starch was slurried in 150 parts water, the pH was adjusted to 7.5 with sodium hydroxide, and the indicated amount of octenylsuccinic anhydride was added slowly while the pH was maintained at 7.5 with the alkali. The reaction was complete when no further addition of alkali was necessary. The pH was adjusted to between 4.0 and 6.5 and the resulting derivatives were recovered by filtration, washed and dried.

To prepare the acetate derivative, 100 parts of the starch was slurried in 150 parts water, adjusting the pH to 8.3 with 3% sodium hydroxide solution, and slowly adding the indicated amount of acetic anhydride while maintaining the pH at 8.3 with the above alkali. The reaction was complete when no further addition of alkali was necessary. The pH was adjusted to between 4.0 and 6.5 and the resulting derivative was recovered as above.

The crosslinked starch was prepared by slurrying 100 parts of starch in 150 parts water, adding 0.8 part sodium hydroxide, 1.0 part sodium chloride, and then adding the indicated amount of phosphorus oxychloride. The slurry was agitated for 3 hours at room temperature. When the reaction was completed, the pH was adjusted to 5.5 with acid. The starch was recovered by filtration, washed, and dried. An aqueous slurry (20-30% solids) was prepared employing one of these modified starches, or where applicable, a native starch. The aqueous starch slurry was jet cooked at approximately 300° F. (149° C.) to gelatinize the starch. The cooked starch dispersion was placed in a constant temperature bath at 58°-60° C. with constant stirring. The pH was adjusted to 5 with 3% hydrochloric acid.

Depending on the type of starch used and its amylopectin content, between 0.5 and 10.0 mls of pullulanase per 100 g of starch were added to the cooked starch dispersion. The pullulanase (E.C. 3.2.1 41, pullulan 6-glucanohydrolase) which was used is a starch debranching enzyme produced by a novel species of Bacillus. This enzyme (Promozyme TM) was obtained from Novo Industri A/S of Denmark. The enzymatic activity of a 1.25 g/ml solution of Promozyme is standardized at 200 PUN/ml of solution. One PUN (pullulanase Unit Novo) is the amount of enzyme which, under standard conditions, hydrolyzes pullulan, liberating reducing carbohydrate with a reducing power equivalent to 1 micro-mol glucose per minute. The procedure for determining PUN is available from Novo Industri A/S. Thus, for example, in a starch dispersion employing corn starch, 125 PUN of pullulanase per 100 g corn starch was added to the dispersion. For a waxy maize starch dispersion (with higher amylopectin content), 750 PUN of pullulanase per 100 g waxy maize starch was added to the dispersion.

The pullulanase was permitted to debranch the starch until the funnel viscosity of the starch dispersion had fallen into the desired range (e.g., 30 seconds at 10% solids for waxy maize starch). The pullulanase was deactivated by heating the dispersion to at least 80° C. The starch dispersion was spray dried at an inlet temperature of 200°-210° C. and an outlet temperature of 85°-90° C. The spray dried starch was screened through #40 mesh screen.

PREPARATION OF THE CHEESES

The percentages of starch and other components employed in imitation mozzarella cheese formulations are set forth below in Table 2.

TABLE 2

| | Cheese Formulations (Percentage by Weight) | | | | |
|---|---|---|---|---|---|
| Ingredients | 0% Starch (Control) | 25% Starch | 33% Starch | 50% Starch | 100% Starch |
| Sodium Caseinate | 25.8 | 19.4 | 17.2 | 12.9 | — |
| Starch | — | 6.4 | 8.6 | 12.9 | 25.8 |
| Water | 50.6 | 50.6 | 50.6 | 50.6 | 50.6 |
| Shortening | 20.6 | 20.6 | 20.6 | 20.6 | 20.6 |
| Lactic Acid | 1.0 | 1.0 | 1.0 | 1.0 | 1.0 |
| Salt (NaCl) | 2.0 | 2.0 | 2.0 | 2.0 | 2.0 |

The cheeses were prepared by dry blending the caseinate and starch (where blends were used) at low speed in a Hobart mixer. The water was added to a second Hobart mixer bowl, equipped with a heating mantle, and heated to 160° F. The shortening was melted and mixed into the water with vigorous agitation. While mixing at medium speed, the starch and/or caseinate component was slowly added to the water and shortening and the dispersion was mixed for 1-2 minutes. Lactic acid was added dropwise to the dispersion and mixing continued for about 2 minutes. Salt was added and mixing continued for about 1 minute. The resulting cheeses were removed, pressed slightly to firm the mixture, and refrigerated at 4° C. (40° F.) for 1-3 days.

The following imitation cheeses were prepared:
A. Control - 25.8% Caseinate (no starch); and
B. Debranched Starch - 25.8% unmodified waxy maize starch (100% caseinate replacement) partially debranched to a funnel viscosity of 30 seconds at 10% solids.

Results of the five point cheese evaluation are shown in Table 3. Overall, the caseinate control ranked 10 (the standard reference) and the cheese prepared from partially debranched waxy maize starch ranked 6. Thus, an acceptable cheese was formulated without any caseinate by employing a partially debranched waxy maize starch which was not derivatized or otherwise chemically modified.

TABLE 3

| | Cheese Evaluation Results | | | | | |
|---|---|---|---|---|---|---|
| Sample* | Gel | Shred | String | Melt | Oil Release | Overall |
| Caseinate Control | 5 | 5 | 4 | 3 | 3 | 10 |
| 30 second unmodified waxy maize starch (100% caseinate replacement) | 3 | 3 | 2 | 3 | 1 | 6 |

*Example 1.

EXAMPLE 2

This example illustrates that up to 100% of the caseinate in the cheese formulation may be replaced with waxy maize or root or tuber-like starches (e.g., potato or tapioca starch) which have been partially debranched by treatment with pullulanase. These starches have not been chemically modified and thus are useful as a "natural" alternative to chemically modified starches. In contrast, debranched corn starch does not provide an acceptable cheese at 100% caseinate replacement.

Imitation cheeses containing 25.8% starch (100% caseinate replacement) were prepared and evaluated as in Example 1 employing the following unmodified starches:

1. waxy maize starch partially debranched to a funnel viscosity of 50 seconds at 10% solids;
2. tapioca starch partially debranched to a funnel viscosity of 57 seconds at 10% solids; and
3. corn starch partially debranched to a funnel viscosity of 25 seconds at 10% solids.

Overall, unmodified waxy maize and tapioca starches which had been partially debranched produced a cheese with an acceptable rating (at least 5). (See Table 4). At a 100% caseinate replacement level, partially debranched corn starch produced a cheese with an unacceptable rating (3).

EXAMPLE 3

This example illustrates the effects of the percentage caseinate replacement on imitation cheese quality for various partially debranched starches.

Imitation cheeses were prepared and evaluated by the methods of Example 1 from starches listed in Table 4.

Results of the five point cheese evaluation are shown in Table 4. At 100% caseinate replacement, none of the debranched starches (except the tapioca and waxy maize starches of Example 2), produced an acceptable cheese.

At 25% caseinate replacement, all starches produced acceptable cheeses. In particular, unmodified debranched corn starch and debranched 0.5% OSA corn starch each produced an excellent cheese with a rating of 9.5.

TABLE 4

| Debranched Starch[a] | % Caseinate Replacement | Cheese Evaluation Results | | | | | |
|---|---|---|---|---|---|---|---|
| | | Gel | Shred | String | Melt | Oil Release | Overall |
| 50 second (10% solids) waxy maize starch | | | | | | | |
| | 100% | 1 | 2 | 3 | 2 | 1 | 5 |
| 57 second (10% solids) tapioca starch | | | | | | | |
| | 100% | 1 | 2 | 3 | 2 | 1 | 5 |
| | 25% | 4 | 3 | 2 | 3 | 3 | 7.5 |
| 25 seconds (10% solids) Corn starch | | | | | | | |
| | 100% | 1 | 2 | 1 | 1 | 1 | 3 |
| | 25% | 5 | 5 | 3 | 3 | 3 | 9.5 |
| 9.8 second (19% solids) acid-converted waxy maize (50 WF) starch | | | | | | | |
| | 100% | 1 | 1 | 1 | 1.5 | 1 | 3 |
| | 25% | 4 | 4 | 1.5 | 2 | 1.5 | 6.5 |
| 46.2 seconds (10% solids) 0.5% OSA corn starch | | | | | | | |
| | 100% | 1 | 2.5 | 1 | 1 | 1 | 3 |
| | 25% | 5 | 5 | 3 | 3 | 3 | 9.5 |

[a]The amount of pullulanase debranching is described by funnel viscosity (in seconds at 10% or 19% solids).

EXAMPLE 4

This example illustrates the effect of degree of starch debranching on the properties of imitation cheese prepared with enzymatically debranched starch.

The imitation cheese formulations indicated in Table 5 were prepared and evaluated by the methods of Example 1.

Results of the cheese evaluation are shown in Table 5. All partially debranched starches produced acceptable cheeses. The fully debranched starch yielded an acceptable cheese at 25% caseinate replacement.

TABLE 5

| Debranched Starches[a] | % Caseinate Replacement | Cheese Evaluation Results | | | | | |
|---|---|---|---|---|---|---|---|
| | | Gel | Shred | String | Melt | Oil Release | Overall |
| 50 second Funnel Viscosity (10% solids) | 100% | 1 | 2 | 3 | 2 | 1 | 5 |
| 30 second Funnel Viscosity (10% solids) | 100% | 3 | 3 | 2 | 3 | 1 | 6 |
| 47 second Funnel Viscosity (10% solids) | 25% | 4 | 2 | 2 | 3 | 3 | 7 |
| 6.6 second Funnel Viscosity (19% solids) (Fully Debranched) | 25% | 4 | 4 | 1 | 2 | 1.5 | 6 |

[a]Unmodified waxy maize starch partially or fully debranched by treatment with pullulanase. See Example 4.

EXAMPLE 5

This example illustrates that a variety of debranched starches and starch derivatives may be employed herein to produce an acceptable cheese. All modified and derivatized starches were prepared by the methods set forth in Example 1.

Imitation cheeses employing 6.4% starch (25% caseinate replacement) were prepared from the partially debranched starches described in Table 6 and evaluated as in Example 1.

Results of the cheese evaluations are shown in Table 6. All modified starches and starch derivatives produced acceptable cheese. Excellent cheeses (ranked 7 to 9.5) were obtained from starches which were lightly (0.5 to 0.75%) derivatized with OSA.

TABLE 6

| Debranched Starch[a, b] | Cheese Evaluation Results | | | | | |
|---|---|---|---|---|---|---|
| | Gel | Shred | String | Melt | Oil Release | Overall |
| A. 9.8 seconds (19% solids) Acid-Converted Waxy Maize Starch | 4 | 4 | 1.5 | 2 | 1.5 | 6.5 |
| B. 40 seconds (10% solids) 3.0% Acetylated Corn starch | 4 | 2 | 3 | 3 | 3 | 7 |
| C. 36 seconds (10% solids) 0.75% OSA Corn starch | 5 | 5 | 3 | 3 | 3 | 9.5 |
| D. 46 seconds (10% solids) 0.5% OSA Corn starch | 5 | 5 | 3 | 3 | 3 | 9.5 |
| E. 12 seconds (19% solids) 1.0% OSA Waxy Maize starch | 4 | 3.5 | 1.5 | 2 | 2 | 6.5 |
| F. 50 seconds (10% solids) 0.5% OSA Waxy Maize Starch | 4.5 | 2 | 2 | 3 | 3 | 7 |
| G. 15 seconds (10% solids) Crosslinked Waxy Maize Starch | 5 | 5 | 3 | 3 | 2 | 9 |
| H. 10 seconds (10% solids) Crosslinked Waxy Maize Starch | 5 | 5 | 3 | 3 | 2 | 9 |

[a]Debranched with pullulanase until the indicated funnel viscosity (seconds at 10% or 19% solids) was reached.
[b]All samples are at 25% caseinate replacement. See Example 5.

EXAMPLE 6

This example illustrates that starches which have been debranched may be blended with a variety of other starches, including granular starch, and the blends may be employed to produce an acceptable imitation cheese.

Imitation cheeses were prepared and evaluated by the method of Example 1 from the starch blends listed in Table 7.

Results of the cheese evaluations are shown in Table 7. Each of these blends produced an acceptable cheese. At 100% caseinate replacement, blend A ranked 7 on the cheese evaluation scale. At 33% caseinate replacement, blend C ranked 9.5. Thus, blends of debranched starches are preferably employed herein.

TABLE 7

| Blends Containing Debranched[a] Starches | % Caseinate Replacement | Cheese Evaluation Results | | | | | |
|---|---|---|---|---|---|---|---|
| | | Gel | Shred | String | Melt | Oil Release | Overall |
| A 45/55 47 seconds (10% solids) Waxy Maize Starch/36 seconds (10% solids) 0.75% OSA Corn starch | 100% | 3.5 | 3 | 2.5 | 2 | 3 | 7 |
| B 40/60 12 seconds (19% solids) 1% OSA Waxy Maize Starch/ 50 seconds (10% solids) 0.5% OSA Waxy Maize Starch | 50% | 4 | 3 | 3 | 3 | 3 | 8 |
| C Same blend as B | 33% | 5 | 4.5 | 3.5 | 3 | 3 | 9.5 |
| D 60/40 47 seconds (10% solids) Waxy Maize Starch/9.8 seconds (19% solids) Acid-Converted (50WF) Waxy Maize Starch | 25% | 5 | 3 | 3 | 3 | 3 | 8.5 |

TABLE 7-continued

Cheese Evaluation Results

| Blends Containing Debranched[a] Starches | | % Caseinate Replacement | Gel | Shred | String | Melt | Oil Release | Over-all |
|---|---|---|---|---|---|---|---|---|
| E | Same blend as D | 50% | 4 | 3 | 2 | 3 | 3 | 7.5 |
| F | 55/45 36 seconds (10% solids) 0.75% OSA Corn Starch/47 seconds (10% solids) Waxy Maize Starch | 50% | 4 | 3 | 3 | 2 | 3 | 7.5 |
| G | 40/60 9.8 seconds (19% solids) Acid-Converted (50WF) Waxy Maize Starch/50 seconds (10% solids) Waxy Maize Starch | 50% | 4 | 2 | 3 | 2 | 3 | 7 |
| H | 25/75 Blend of the starches of G | 33% | 5 | 3 | 4 | 3 | 3 | 9 |
| I | 65/35 10 seconds (19% solids) Waxy Maize Starch/Granular Waxy Maize Starch | 33% | 3 | 2 | 2 | 1.5 | 1.5 | 5 |
| J | 65/35 10 seconds (19% solids) Waxy Maize Starch/3% OSA Granular Waxy Maize Starch | 33% | 3.5 | 2 | 2 | 1.5 | 2 | 5.5 |
| K | 40/60 10 seconds (19% solids) Waxy Maize Starch/Acid-Converted (43WF) Cold-Water-swelling Tapioca Starch | 33% | 4.5 | 4 | 3 | 3 | 3 | 9 |

[a]Debranched with pullulanase until the indicated funnel viscosity (seconds at 10% or 19% solids) was reached.

EXAMPLE 7

This example illustrates that debranched starch may be employed to replace some, or all, of the caseinates in imitation processed American cheese.

Imitation processed American cheese formulations are set forth in Table 8 below.

TABLE 8

| Ingredients | 0% Starch Control | 25% Starch | 33% Starch | 50% Starch | 100% Starch |
|---|---|---|---|---|---|
| Sodium and Calcium Caseinate | 25.0 | 18.8 | 16.8 | 12.5 | 0 |
| Starch | 0 | 6.2 | 8.2 | 12.5 | 25.0 |
| Shortening | 28.1 | 28.1 | 28.1 | 28.1 | 28.1 |
| Salt (NaCl) | 2.0 | 2.0 | 2.0 | 2.0 | 2.0 |
| Sodium Aluminum Phosphate | 0.9 | 0.9 | 0.9 | 0.9 | 0.9 |
| Citric Acid | 0.5 | 0.5 | 0.5 | 0.5 | 0.5 |
| Sodium Citrate | 0.2 | 0.2 | 0.2 | 0.2 | 0.2 |
| Water | 43.3 | 43.3 | 43.3 | 43.3 | 43.3 |

The cheeses are prepared from any of the debranched starches disclosed herein by:

(1) adding 85% of the water to a Hobart Mixer bowl fitted with a heating mantle and heating it to 160° F.;
(2) adding salt and sodium aluminum phosphate to the water with mixing until dissolved;
(3) adding melted shortening to the bowl with mixing at medium speed;
(4) slowly adding a dry blend of caseinates (or starch and caseinates) to the bowl with mixing at medium speed;
(5) mixing the blend for 1-2 minutes;
(6) adding a 160° F., solution of the remaining water, the citric acid and sodium citrate to the blend;
(7) mixing the blend for about 2 minutes; and
(8) removing the blend from the bowl, pressing slightly to firm the mixture and refrigerating at 4° C. (40° F.) for 1-3 days.

EXAMPLE 8

This example illustrates that debranched starch may be employed to replace some, or all, of the caseinates in imitation cream cheese.

Imitation cream cheese formulations are set forth in Table 9 below.

TABLE 9

| Ingredients | 0% Starch Control | 25% Starch | 33% Starch | 50% Starch | 100% Starch |
|---|---|---|---|---|---|
| Cream and Water | 92.05 | 92.05 | 92.05 | 92.05 | 92.05 |
| Non-fat dry milk | 4.0 | 4.0 | 4.0 | 4.0 | 4.0 |
| Sodium Caseinate | 4.0 | 3.0 | 2.7 | 2.0 | 0 |
| Starch | 0 | 1.0 | 1.3 | 2.0 | 4.0 |
| Stabilizer Blend | 0.35 | 0.35 | 0.35 | 0.35 | 0.35 |
| Lactic Acid | 1.60 | 1.60 | 1.60 | 1.60 | 1.60 |

The cheeses are prepared from any of the debranched starches disclosed herein by:

(1) standardizing the butterfat content of the cream and water blend to 33.5%;

(2) adding sufficient caseinate or starch and non-fat dry milk solids to the cream and water blend to standardize the total solids to 55%;

(3) heating the blend to 170° F. for 10 minutes;

(4) homogenizing the blend;

(5) adding the lactic acid; and (6) packaging the cheese while hot.

EXAMPLE 9

This example illustrates that debranched starch may be employed to replace some of the casein in rennet casein-containing imitation cheese.

Cheeses were prepared from the rennet casein formulations set forth in Table 10 below.

TABLE 10

Rennet Casein Imitation Cheese Formulations

| Ingredients | 0% Starch | | 33% Starch | |
|---|---|---|---|---|
| Formula: | A | B | A | B |
| Water | 47.2 | 44.6 | 47.2 | 44.6 |
| Sodium Citrate | 3.9 | 4.1 | 3.9 | 4.1 |
| Rennet Casein | 24.6 | 25.8 | 16.5 | 17.3 |
| Starch | 0 | 0 | 8.1 | 8.5 |
| Shortening | 22.6 | 23.7 | 22.6 | 23.7 |
| Lactic Acid (88%) | 0.8 | 0.8 | 0.8 | 0.8 |
| Sodium Citrate | 1.0 | 1.0 | 1.0 | 1.0 |

The cheeses were prepared by:

(1) adding sodium citrate and a portion of the water to a Hobart Mixer equipped with a heating mantle and heating at 110° F. until the citrate dissolves;

(2) removing the heating mantle;

(3) slowly adding the casein with mixing at low speed for 5 minutes;

(4) returning the heating mantle to the bowl;

(5) adding the shortening with mixing at low speed;

(6) adding the starch and mixing for 5 minutes at about 160° F.;

(7) adding a portion of the water (at 212° F.) and mixing for another 5 minutes;

(8) adding a solution of sodium citrate, lactic acid and water (at 212° F.) to the bowl and mixing until a smooth, elastic homogeneous cheese product was obtained; and (9) pressing the cheese into a mold and refrigerating the cheese.

Cheeses were prepared from these formulations employing the starches described in Table 11, below, at 33% casein replacement and evaluated as in Example 1. Results are tabulated in Table 11. All starches yielded an acceptable cheese.

TABLE 11

Cheese Evaluation Results

| Blends Containing Debranched[a] Starches | Gel | Shred | String | Melt | Oil Release | Overall |
|---|---|---|---|---|---|---|
| A[b] 65/35 Blend: debranched/ acid-converted (35WF) cold-water-swelling waxy maize | 5 | 5 | 3 | 3 | 2 | 9 |
| B[b] 65/35 Blend: debranched/ granular waxy maize starch | 4.5 | 4.5 | 2.5 | 3 | 2 | 8 |
| C[b] 65/35 Blend: debranched/ 3% OSA granular waxy maize | 3 | 2 | 2 | 1.5 | 2 | 5 |
| D[c] 65/35 Blend: debranched/ 1-½% OSA cold-water-swelling waxy maize | 5 | 4.5 | 2.5 | 3 | 2 | 8 |
| E[c] 40/60 Blend: debranched/ acid-converted (43 WF) cold-water-swelling tapioca | 4 | 4 | 3 | 3 | 3 | 8.5 |

[a]Waxy maize debranched to a funnel viscosity of 10 seconds at 19% solids.
[b]Formula A, Table 10.
[c]Formula B, Table 10.

EXAMPLE 10

This example demonstrates that the appearance, texture and eating qualities of cheeses prepared from the debranched starches herein are preferred over those of the cheeses prepared from the commercially available starches disclosed in the Zwiercan '116 and Zwiercan, '475 patents.

The following imitation cheese formulas containing 12.9% starch (50% caseinate replacement) were prepared by the method of Example 1 and submitted to a taste panel of 15 or 16 people for organoleptic testing:

A. Control - Example IX, Table IV, columns 17 and 18 of the Zwiercan '116 patent. This starch is an acid-converted (40 WF) cornstarch which was treated with 1% OSA, jet cooked to gelatinize and spray dried.

B. Control - Example III, Table II, columns 14, 15 and 16 of the Zwiercan '475 patent. This starch is an acid-converted (3% HCl treatment) high amylose cornstarch (Hylon V) which was treated with 3% OSA, jet cooked to gelatinize and spray-dried.

C. Debranched Starch Blend - This starch is a 40/60 blend of 1% OSA waxy maize starch debranched to a funnel viscosity of 12 seconds (19% solids)/0.5% OSA waxy maize starch debranched to a funnel viscosity of 50 seconds (10% solids) (blend B of Example 6 above).

ORGANOLEPTIC TESTS

The cheese prepared from debranched starch C was compared to control A and to control B in two sets of organoleptic tests.

In the first test, samples of cheeses C and A were grated and sprinkled onto English muffins coated with pizza sauce. Samples were heated at 204.5° C. (400° F.) for 8 minutes to melt the cheese, blind-coded with three digit numbers and subjected to a Triangle Test Difference Analysis taste panel test conducted with a 15 person panel. All 15 persons on this panel correctly selected the odd sample out of the three samples presented. Thus, there was a statistically significant (at 99% confidence level) difference between the organoleptic properties of cheeses C and A.

In the same test, the 15 panelists were also asked to evaluate the texture of the cheese and rank each sample on a scale of 1 to 4 for melt and string. Cheese C, the debranched starch, was preferred by 14 panelists for string and by all 15 panelists for melt. These results represent a statistically significant (at 99% confidence level) preference for the texture of cheese C, prepared from debranched starch, over the control cheese A.

In the second test, samples of cheeses C and B were prepared and tested as above, except that the panel consisted of 16 persons. Again, all persons on the panel correctly selected the odd sample in the Triangle Test Difference Analysis. Cheese C, the debranched starch, was preferred by 15 panelists for string and by all 16 panelists for melt. These results represent a statistically significant (at 99% confidence level) difference between the cheeses and preference for the cheese prepared from debranched starch over the control cheese B.

Therefore, the appearance, texture, melt and string of cheeses of this invention are preferred over that of those cheeses prepared from starch compositions that are commercially used as caseinate replacers in imitation cheeses.

Now that the preferred embodiments of the present invention have been described in detail, various modifications and improvements thereon will become readily apparent to those skilled in the art. Accordingly, the scope and spirit of the invention are to be limited only by the claims and not by the foregoing specification.

We claim:

1. An imitation cheese, consisting essentially of water; fat or oil; cheese additive(s); gelatinized starch which has been enzymatically treated with an enzyme capable of cleaving alpha-1,6-D-glucosidic linkages of the starch to partial debranch the starch and yield a mixture, comprising partially debranched amulopectin and short chain amylose, which mixture provides the texture, thermoreversibility and emulsification characteristics of caseinates in imitation cheese; and one or more edible caseinate(s), wherein up to 80% of the caseinate(s) have been replaced with the starch.

2. The cheese of claim 1, wherein the starch is corn, potato, rice, tapioca, waxy maize, sago, or a mixture thereof.

3. The cheese of claim 1, wherein the starch is derivatized by treatment with up to about 10% propylene oxide, or up to about 2% succinic anhydride, or up to about 3% octenyl succinic anhydride, or a sufficient amount of acetic anhydride to provide a maximum of about 2.5% bound acetyl, or a sufficient amount of sodium or potassium orthophosphate, sodium or potassium tripolyphosphate, or mixture thereof to provide a maximum of about 0.4% bound phosphate.

4. The cheese of claim 1, wherein the starch is crosslinked by treatment with phosphorous oxychloride, epichlorohydrin, sodium trimetaphosphate, or adipic-acetic anhydride.

5. The cheese of claim 1, wherein the starch is converted to a water fluidity of up to 70 by acid or enzyme-conversion, or by oxidation with treatment with up to about 2% active chlorine.

6. The cheese of claim 1, wherein the starch is debranched to yield a mixture comprising up to 80%, by weight, short chain amylose, and at least 20%, by weight, partially debranched amylopectin.

7. The cheese of claim 1, wherein the starch further comprises amylopectin, or long chain amylose, or a combination thereof.

8. The cheese of claim 1, wherein up to 80% of the caseinate is replaced with a blend, comprising 20 to 80 parts of the partially debranched starch mixture and 80 to 20 parts of a waxy maize or a root or tuber-like starch, selected from the group consisting essentially of starch, partially and fully debranched starch, starch derivatives, converted starch, crosslinked starch and combinations thereof.

9. An imitation cheese, consisting essentially of water; fat or oil; cheese additive(s); gelatinized waxy maize, potato or tapioca starch which has been enzymatically treated with an enzyme capable of cleaving alpha-1,6-D-glucosi linkages of the starch to partially debranch the starch and yield a mixture, comprising partially debranched amylopectin and short chain amylose which mixture provides the texture, thermoreversibility and emulsification characteristics of caseinates in imitation cheese; and, optionally, one or more edible caseinate(s), wherein up to 100% of the caseinate(s) have been replaced with the starch.

10. The cheese of claim 9, wherein the starch is debranched to yield a mixture comprising up to 80%, by weight, short chain amylose and at least 20%, by weight, partially debranched amylopectin.

11. The cheese of claim 9, wherein the starch further comprises amylopectin, or long chain amylose, or a combination thereof.

12. The cheese of claim 9, wherein the starch is crosslinked by treatment with 0.02 to 0.1% phosphorus oxychloride.

13. The cheese of claim 9, wherein the starch is treated with 0.5 to 3% octenyl succinic anhydride to form the starch ester derivative.

14. An imitation cheese, consisting essentially of water; fat or oil; cheese additive(s); a starch blend, comprising 30 to 70 parts of (a) a gelatinized waxy maize, potato or tapioca starch, which starch has been enzymatically treated with an enzyme capable of cleaving alpha-1,6-D-glucosidic linkages of the starch to partially debranch the starch and yield a mixture, comprising partially debranched amylopectin, short chain amulose and amylopectin, and (b) 30 to 70 parts of corn starch which has been treated with from 0.5 to 3% octenyl succinic anhydride to form the starch ester derivative and enzymatically treated with an enzyme capable of cleaving alpha-1,6-D-glucoid linkages of the starch to partially debranch the starch and yield a mixture, comprising long chain amylose, partially debranched amylopectin, short chain amylose and amylopectin, which starch blend provides the texture thermoreversibility and emulsification characteristics of caseinates in imitation cheese; and, optionally, one or more edible caseinate(s), wherein up to 100% of the caseinate(s) have been replaced with the starch.

15. An imitation cheese, consisting essentially of water; fat or oil; cheese additive(s); gelatinized starch which has been enzymatically treated with an enzyme capable of cleaving alpha-1,6-D-glucosidic linkages of the starch fully debranch the starch and yield a mixture, comprising short chain amylos which mixture provides the texture, thermoreversibility and emulsification characteristics of caseinates in imitation cheese; and one or more edible caseinate(s), wherein up to one-third of the caseinate(s) have been replaced with the starch.

16. The cheese of claim 15, wherein the starch is corn, rice, potato, tapioca, waxy maize, sago or a mixture thereof.

17. The cheese of claim 15, wherein the starch further comprises long chain amylose.

18. The cheese of claim 15, wherein the starch is derivatized by treatment with up to about 10% propylene oxide, or up to about 2% succinic anhydride, or up to about 3% octenyl succinic anhydride, or a sufficient amount of acetic anhydride, or a sufficient amount of acetic anhydride to provide a maximum of about 2.5% bound acetyl, or a sufficient amount of sodium or potassium orthophosphate, sodium or potassium tripolyphosphate, or mixture thereof to provide a maximum of about 0.4% bound phosphate.

19. The cheese of claim 15, wherein the starch is crosslinked by treatment with phosphorus oxychloride, epichlorohydrin, sodium trimetaphosphate, or adipic-acetic anhydride.

20. The cheese of claim 15, wherein up to one-third of the caseinate is replaced with a blend, comprising 20 to 80 parts of the fully debranched starch mixture and 80 to 20 parts of a waxy maize or a root or tuber-like starch, selected from the group consisting essentially of starch, partially and fully debranched starch, starch derivatives, converted starch, crosslinked starch and combinations thereof.

* * * * *